United States Patent [19]
Fairbairn et al.

[11] Patent Number: 5,507,201
[45] Date of Patent: Apr. 16, 1996

[54] ACCELERATOR ASSEMBLY FOR AUTOMOTIVE VEHICLE

[75] Inventors: James A. Fairbairn, Livonia; Daniel H. Lauring, Huntington Woods; Ronald A. Smith, Milford, all of Mich.

[73] Assignee: Ford Motor Company, Dearborn, Mich.

[21] Appl. No.: 316,300

[22] Filed: Sep. 30, 1994

[51] Int. Cl.⁶ .................................................. G05G 1/14
[52] U.S. Cl. ................................................ 74/513; 74/514
[58] Field of Search ................................. 74/512, 513, 514

[56] References Cited

U.S. PATENT DOCUMENTS

| | | |
|---|---|---|
| 3,388,611 | 1/1966 | Clary et al. . |
| 3,630,326 | 12/1971 | Kawaguchi . |
| 3,641,837 | 2/1972 | Dean, Jr. . |
| 3,695,379 | 10/1972 | Veilleux . |
| 3,857,304 | 12/1974 | Berndt . |
| 4,087,776 | 5/1978 | Donato . |
| 4,297,550 | 1/1981 | Leighton . |
| 4,335,689 | 6/1982 | Abe et al. . |
| 4,703,823 | 11/1987 | Yogo et al. . |
| 4,718,380 | 1/1988 | Katayose et al. . |
| 4,727,838 | 3/1988 | Oshiage et al. . |
| 4,802,381 | 2/1989 | Hsin-Hsin . |
| 4,831,985 | 5/1989 | Mabee et al. . |
| 4,875,385 | 10/1989 | Sitrin . |
| 4,883,037 | 11/1989 | Mabee et al. . |
| 4,944,269 | 7/1990 | Imoehl . |
| 4,958,607 | 10/1990 | Lundberg . |
| 4,976,166 | 12/1990 | Davis et al. . |
| 5,063,811 | 11/1991 | Smith et al. . |
| 5,133,225 | 7/1992 | Lundberg et al. ............... 74/512 X |
| 5,237,891 | 8/1993 | Neubauer et al. ............... 74/514 X |

Primary Examiner—Rodney H. Bonck
Assistant Examiner—Mary Ann Battista
Attorney, Agent, or Firm—Jerome R. Drouillard; Roger L. May

[57] ABSTRACT

An accelerator pedal assembly for an automotive vehicle includes a pedal member pivotably attached to the floor area of the vehicle and a combination pedal travel limiter and position indicating unit mounted above the pedal member. The combination unit includes a rotary position indicator having a driveshaft extending therefrom to a roller follower, which is mounted upon the driveshaft and which tracks movement of the pedal member. The driveshaft and follower are mounted in a bracket which has integral idle and wide-open throttle stops incorporated therein, such that over-travel of the pedal member will not cause over-travel of the rotary position indicator.

12 Claims, 3 Drawing Sheets

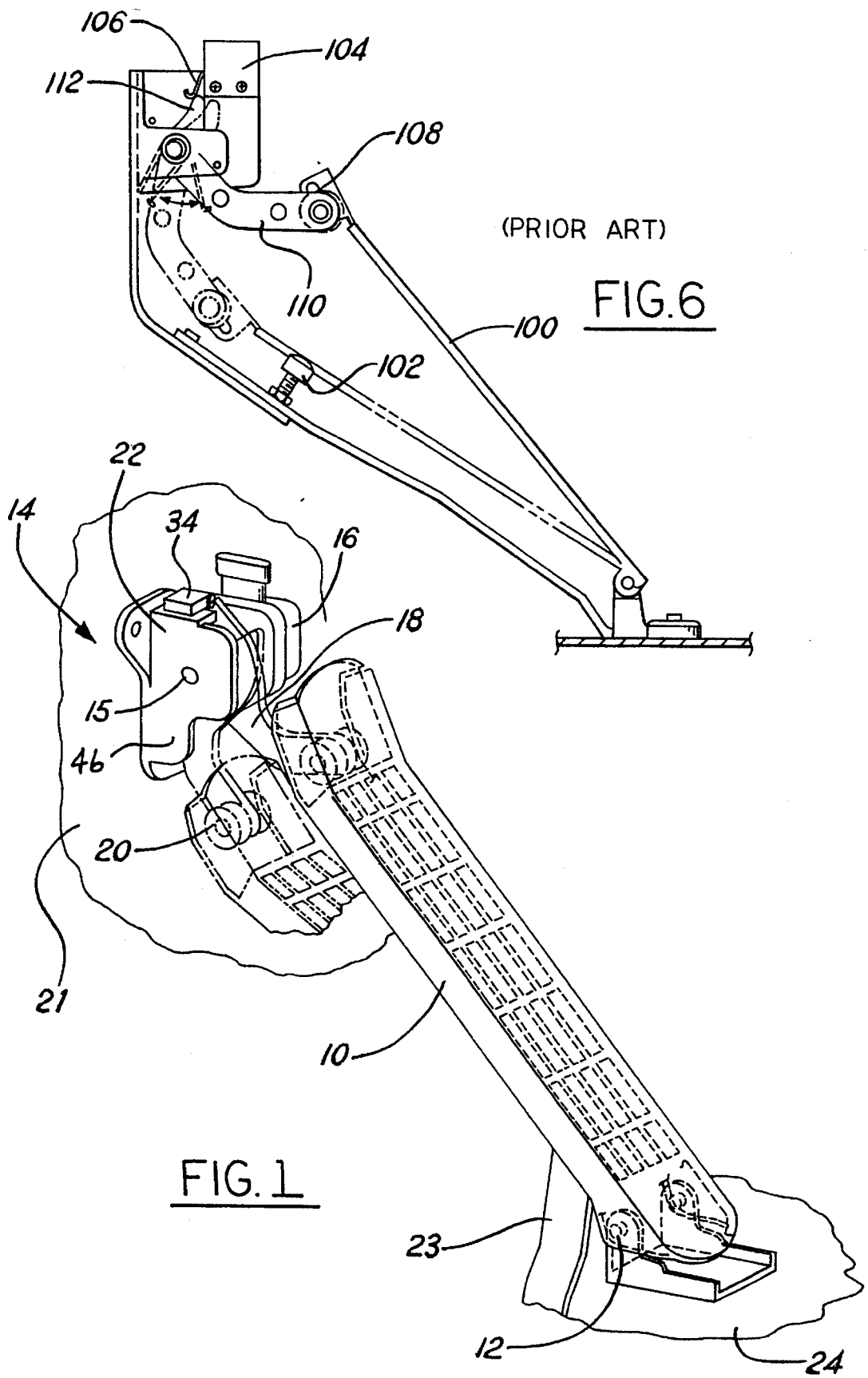

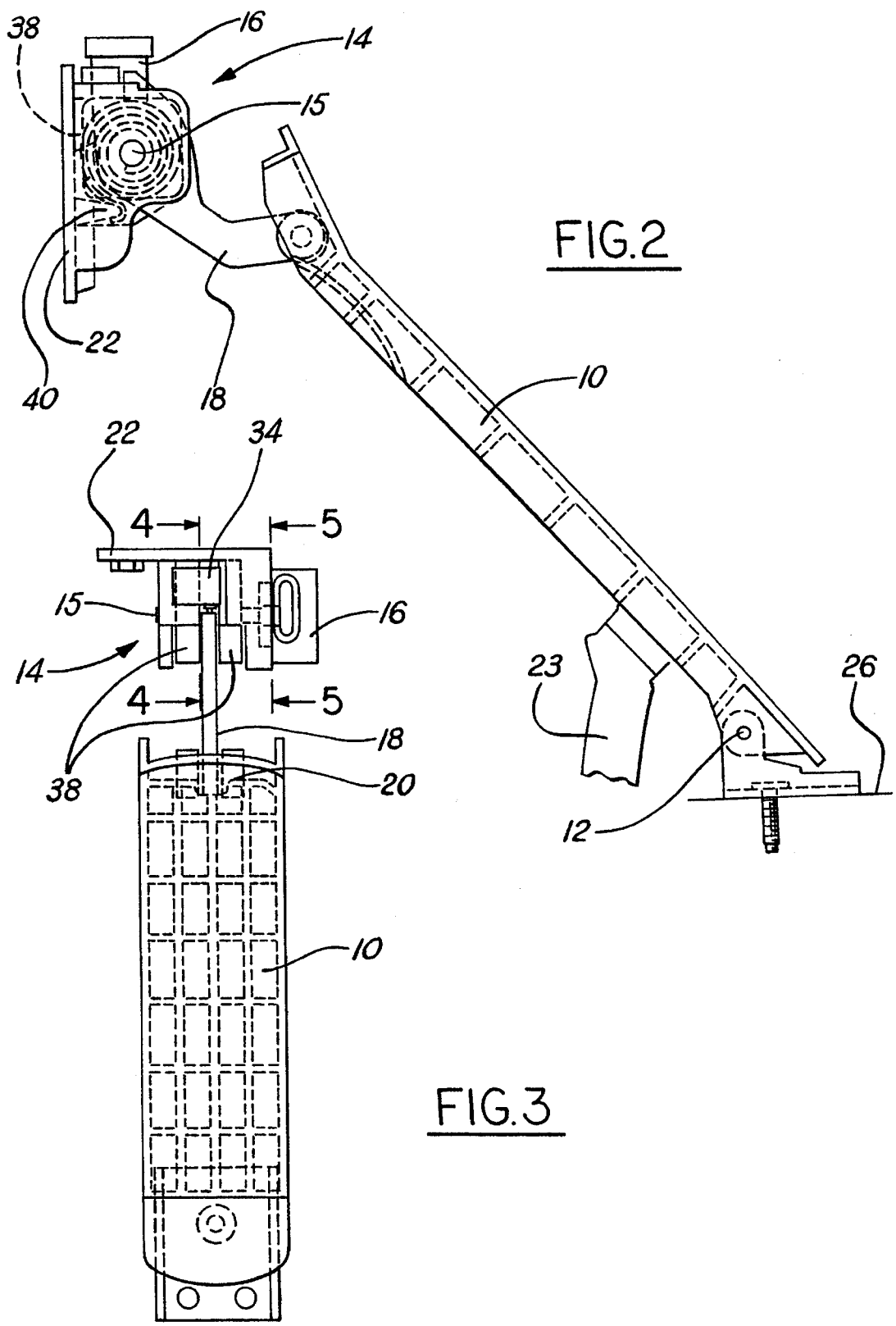

ACCELERATOR ASSEMBLY FOR AUTOMOTIVE VEHICLE

BACKGROUND OF THE INVENTION

The present invention relates to an accelerator pedal assembly for an automotive vehicle equipped with an electronically controlled powertrain.

DISCLOSURE INFORMATION

With the advent of electronically controlled internal combustion engines, and indeed, electric vehicle powertrains, the need has arisen for a robust accelerator assembly which will reliably convey to an engine's electronic controller the position of the accelerator. Early electronic control accelerator pedals suffered from the drawback that the rotary position indicator associated with the pedal was frequently mounted either below the floorboard of the vehicle or at the floorboard, with the result that dirt carried on the operator's shoes would invade the position indicator, rendering it inoperative. U.S. Pat. No. 5,063,811, which is assigned to the assignee of the present invention, discloses an accelerator pedal assembly in which the rotary position indicator is mounted above the pedal. The system of the '811 patent suffers from several deficiencies, however, which are remedied by an assembly according to the present invention. In the first case, with the system of the '811 patent, the idle and full throttle stops required to prevent over-travel of the rotary position indicator are not integrated with the bracket to which the position indicator is mounted. As a result, in a misguided attempt to obtain more power from the engine, a vehicle driver may be able to obtain more rotary travel with the position indicator than the electronic control system can tolerate by simply bending the throttle stop, which was positioned on the vehicle toeboard below the accelerator pedal. Another problem with the system of the '811 patent related to the idle verification switch, which relied on a actuating lever 72. Because this lever required careful adjustment, and was subject to misadjustment, and the accuracy of the accelerator pedal assembly signal output was impaired.

The present accelerator assembly solves problems associated with known prior art systems by providing idle and wide open throttle stops which are integral with the bracket upon which the rotary position indicator is attached. The present assembly also solves problems with the prior art idle verification switch mounting systems because the follower which tracks the movement of the pedal member directly contacts the idle verification switch plunger without the need for any intermediate linkage or wipers or other types of actuators.

SUMMARY OF THE INVENTION

According to the present invention, an accelerator pedal assembly for an automotive vehicle equipped with an electronically controlled powertrain includes a pedal member pivotably attached to a floor area of the vehicle and a combination pedal travel limiter and position indicating unit mounted above the pedal member, with the combination unit including a rotary position indicator having a driveshaft extending therefrom and a follower mounted upon the driveshaft for tracking movement of the pedal member, with the follower being compliantly urged into contact with the pedal member.

A bracket for rotatably mounting the driveshaft to a wall of the passenger compartment above the pedal member has idle stop and wide-open throttle stops incorporated therein such that the idle stop contacts and limits travel of the follower and accelerator pedal when the rotary position indicator has reached an idle position, with the wide-open throttle stop contacting and limiting travel of the follower and the pedal member when the position indicator has reached the wide-open throttle position.

The follower, which tracks movement of the pedal member, preferably comprises a hub section mounted to the driveshaft and a depending lever section, the hub section having an idle abutment for contacting the idle stop and a idle cam formed in the hub section for contacting and actuating a plunger projecting from an idle verification switch, which is also mounted upon the bracket which carries the rotary position indicator driveshaft.

It is an advantage of the present invention that an accelerator assembly according to the present invention is much more resistant to wear and tampering by vehicle drivers because the accelerator stops for idle and wide-open throttle are not located on the toeboard of the vehicle but are rather integrated with the bracket which mounts the rotary position indicator. This construction positively eliminates overtravel of the accelerator rotary position indicator, thereby preventing the engine control problems which could result from out-of-specification signals from the accelerator position indicator.

It is a further advantage of the present invention that an assembly according to this invention will function even if the accelerator pedal member is broken, or deformed, or, even if it is missing. Even in the last case, the accelerator rotary position indicator will continue to provide an accurate reading.

It is a further advantage of the present invention that an assembly according to this invention will occupy less package space within the passenger compartment of a vehicle, while being installed more readily, because only minimal coverage of the toeboard area is required.

Other advantages of the present invention will become apparent to the reader of this specification.

BRIEF DESCRIPTION OF THE DRAWINGS

FIG. 1 is a perspective view of an accelerator assembly according to the present invention.

FIG. 2 is a side view of an accelerator assembly according to the present invention.

FIG. 3 is a plan view of an accelerator pedal system according to the present invention.

FIG. 6 is an illustration of a prior art accelerator pedal assembly.

DETAILED DESCRIPTION OF THE PREFERRED EMBODIMENTS

Figure 4:
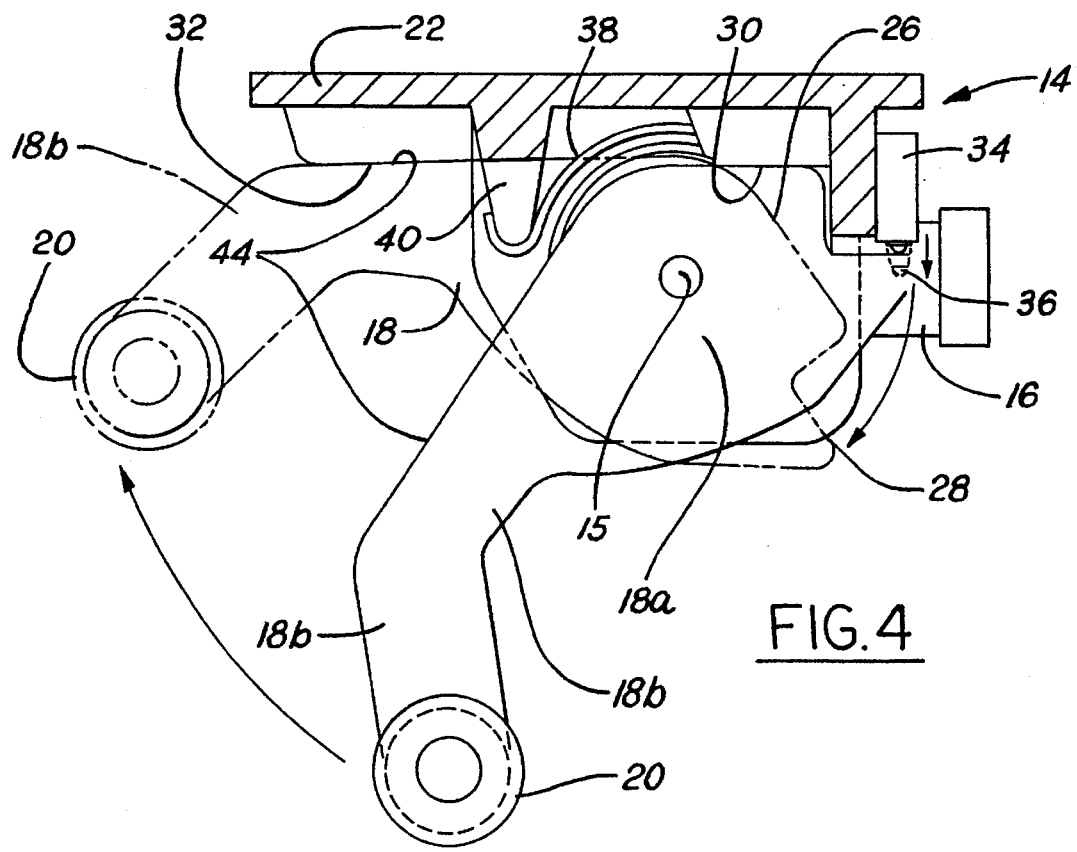
FIG. 4 is a partially broken-away sectional view taken along the lines 4—4 of FIG. 3.

As shown in FIG. 6, a prior art accelerator pedal assembly has a pedal member 100 having a slot 108 at the upper end thereof, which is engaged with follower 110. Idle verification switch 104, having a switch wiper 106 is actuated by a projection 112 from follower 110. It has been determined that placement of switch 104 and wiper 106 frequently cause problems because it is difficult to maintain proper adjustment of switch 104 for the simple reason that follower 110 does not act directly upon the plunger projecting from the switch. The wide-open throttle position of the prior art accelerator system of FIG. 6 is determined by stop 102. As noted above, this created problems because the operator of the vehicle could move stop 102 out of adjustment, either intentionally or unintentionally, by overly vigorous movements of the pedal 100. This in turn would cause problems inasmuch as an electronic engine controller could receive an out-of-range signal from the rotary position indicator. Similarly, if the idle verification portion of an accelerator assembly according to the prior art device shown in FIG. 6 as device 104 goes out of adjustment, it is possible that an electronic powertrain controller could suffer at least a partial loss of strategy, causing drivability problems.

As shown in FIG. 1, the present invention includes pedal member 10, which is pivotably attached by floor pivot 12 to floor 24 of the passenger compartment of the vehicle. Pedal member 10 contacts rollers 20 which are journalled to follower 18. Follower 18 is non-rotatably attached to driveshaft 15, which extends into driving contact with rotary position indicator 16, which is used to convey to the vehicle's powertrain the precise position of pedal member 10. Driveshaft 15 and follower 18 are carried by bracket 22, which is mounted to wall 21 of the passenger compartment. When pedal member 10 is in the uppermost or idle position, which is shown in solid lines in FIG. 1, rotary position indicator 16 indicates that the vehicle's driver desires that the engine or other prime mover be in the idle operating mode, whereas when the accelerator is in the fully depressed position, as shown in ghost lines in FIG. 1, rotary position indicator 16 indicates that the driver desires maximum power output from the engine. If desired, a mechanical connection with the engine's throttle may be established via blade 23, which is shown in FIGS. 1 and 2; as depending from pedal member 10.

As seen in FIG. 3, follower 18 is centrally located on driveshaft 15 between two flat wound torsion springs 38, which have one end engaged with driveshaft 15 and a second end engaged with spring anchor 40, which is integral with bracket 22 (FIGS. 2 and 4). Because one of springs 38 is on either side of follower 18, driveshaft 15 and follower 18 are able to rotate smoothly without the side loading or excessive radial loading which would be caused by an asymmetrical spring arrangement. Torsion springs 38 urge follower 18 to the idle position, and in so doing, maintain rollers 20 in contact with pedal member 10. Rollers 20, taken together, comprise an assembly for contacting said pedal member 10 in such a manner that the sole operative contact between pedal member 10 and the follower is provided by the roller assembly.

As shown in the various figures, idle verification switch 34 is mounted upon bracket 22 and has plunger 36 projecting therefrom. Notice that as shown in FIGS. 1, 3, 4, and 5, plunger 36 of idle verification switch 34 is contacted directly by idle cam 28 of follower 18; there are no intervening linkages, wipers, levers or other devices for actuating idle verification switch 34. Because the configuration of idle cam 28, and indeed the entire configuration of follower 18, can be easily controlled during manufacturing, particularly where follower 18 is constructed by casting, precise operation of rotary position indicator and idle verification switch 34 is assured by an accelerator assembly according to the present invention.

Figure 5:
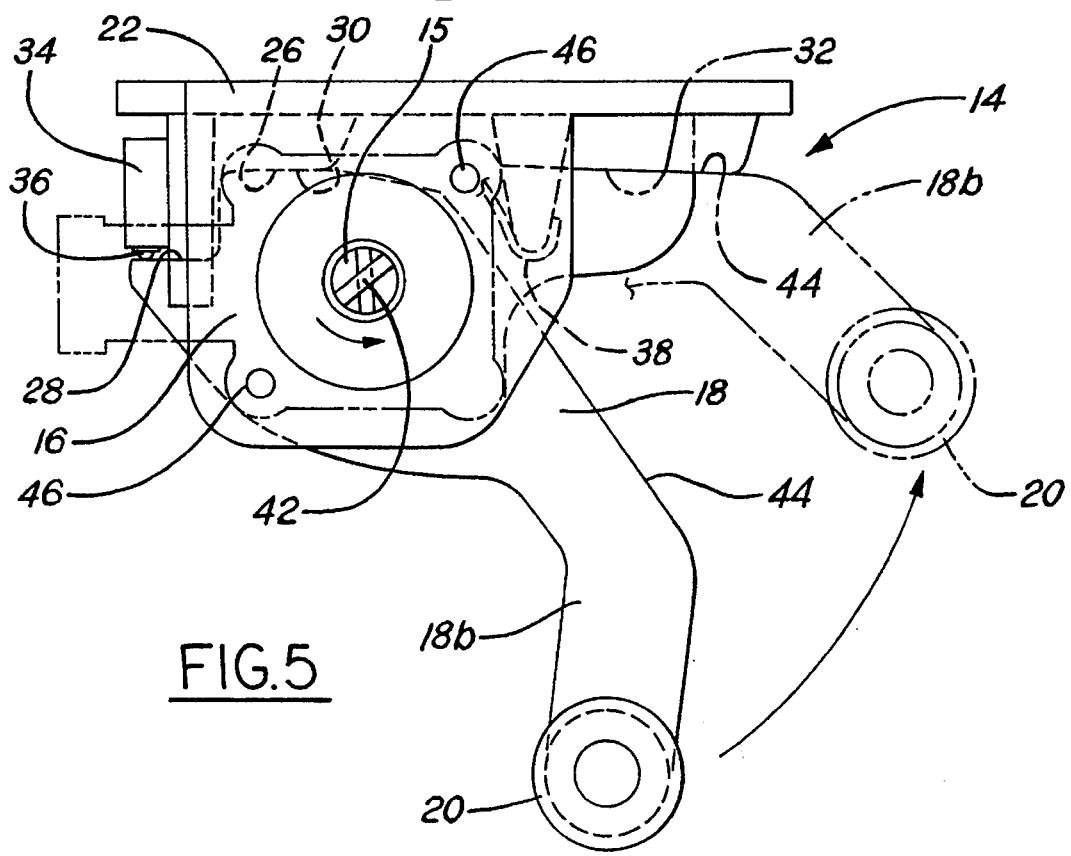
FIG. 5 is a partially broken-away sectional view of the rotary position indicator and follower of FIG. 3 taken along the line 5—5 of FIG. 3.

Additional details of follower 18 are shown with particularity in FIGS. 4 and 5, which show follower 18 in both the idle and wide open throttle positions.

FIGS. 4 and 5 show follower 18 in the wide-open throttle position in broken lines. While at wide-open throttle, wide-open throttle abutment 44 of follower 18 contacts wide-open throttle stop 32, which is carried on and which is integral with bracket 22. Similarly, when follower 18 is at the idle position, as shown in solid lines in FIGS. 4 and 5, idle cam 28 contacts plunger 36 of idle verification switch 34, and idle abutment 26 of follower 18 contacts idle stop 30, which is formed integrally with bracket 22. Because the configurations of bracket 22 and follower 18 may be easily controlled during manufacturing, precise rotational relationships between rotational position sensor 16, follower 18 and bracket 22 may be established during manufacturing and, due to the nature of the present design, these relationships are not subject to change even if pedal member 10 should become bent, broken, or even removed from a vehicle. Because idle stop 30 and wide-open throttle stop 32 are integral and non-adjustable, both overtravel of rotary position indicator 16 past the idle and wide open throttle positions and the problems of driver tampering, misuse, and wear associated with earlier designs have been obviated. The robustness of the present design is further underscored by the fact that hub section 18A of follower 18 and lever section 18B of follower 18 are generally planar and thus not subject to off-center loading and twisting under excessive loads from pedal member 10. If need be, rotary position indicator 16 may be removed from the present assembly by merely removing two screws (not shown) which mount through apertures 46 in bracket 22 (FIG. 5). This renewability feature for rotary position indicator 16 is further enhanced by the fact that indicator 16 is driven by tang 42 which projects axially from driveshaft 15 and which mates with a slot formed in a rotatable portion of rotary position indicator 16 (not shown).

As shown in FIG. 1, bracket 22 has integral shield 46 extending from the base portion of the bracket in a location proximate wide open throttle stop 32 such that foreign matter is prevented from being introduced between wide open throttle abutment 44 and wide open throttle stop 32.

While the invention has been shown and described in its preferred embodiments, it will be clear to those skilled in the arts to which it pertains that many changes and modifications may be made thereto without departing from the scope of the invention.

We claim:

1. An accelerator pedal assembly for automotive vehicle equipped with an electronically controlled internal combustion engine, comprising:

a pedal member adapted to be pivotally attached to a floor area of the vehicle; and a combination pedal travel limiter and position indicating unit mounted above the pedal member, with said unit comprising:

a rotary position indicator having a driveshaft extending therefrom;

a follower, mounted upon said driveshaft, for tracking movement of the pedal member, with said follower being compliantly urged into contact with the pedal member;

a bracket for rotatably mounting said driveshaft to a wall of a passenger compartment above the pedal member, with said bracket having an idle stop and a wide open throttle stop incorporated therein, such that the idle stop contacts the follower so as to limit travel of the follower and the pedal member when the rotary position indicator has reached an idle position, and the wide open throttle stop contacts the follower so as to limit travel of the follower and the pedal member when the rotary position indicator has reached a wide open throttle position.

2. An accelerator pedal assembly according to claim 1, wherein said idle stop and said wide open throttle stop are each integral with said bracket.

3. An accelerator pedal assembly according to claim 2, wherein said idle stop and said wide open throttle stop are fixed to said bracket and are nonadjustable.

4. An accelerator pedal assembly according to claim 1, wherein said follower comprises a hub section mounted to the driveshaft and a depending lever section, with said hub section having an idle abutment for contacting said idle stop.

5. An accelerator pedal assembly according to claim 4, further comprising an idle verification switch mounted to said bracket such that an idle cam formed in said hub section will contact and actuate a plunger projecting from said switch whenever the idle abutment is in contact with the idle stop.

6. An accelerator pedal assembly according to claim 1, wherein said driveshaft and said follower are biased into an idle position by spring means extending between said bracket and said driveshaft.

7. An accelerator pedal assembly according to claim 6 wherein said spring means comprises two torsion springs, with one of said torsion springs mounted about said driveshaft on either side of said follower, such that said driveshaft is acted upon equally by each of said torsion springs.

8. An accelerator pedal assembly for an automotive vehicle equipped with an electronically controlled internal combustion engine, comprising:

a pedal member adapted to be pivotably attached to a floor area of vehicle; and a combination pedal travel limiter and position indicating unit mounted above the pedal member, with said unit comprising:

a rotary position indicator having a driveshaft extending therefrom;

a follower, mounted upon said driveshaft, for tracking movement of the pedal member, with said follower being compliantly urged into contact with the pedal member by means of redundant torsion springs mounted about the driveshaft, and with a roller mounted on said follower said roller comprising the sole operative contact between the pedal member and the follower; and a bracket for rotatably mounting said driveshaft, with said bracket having an integral, nonadjustable idle stop and an integral, nonadjustable wide open throttle stop incorporated therein, such that the idle stop contacts the follower, so as to limit travel of the follower and the pedal member when the rotary position indicator has reached an idle position, and the wide open throttle stop contacts a portion of the follower so as to limit travel of the follower and the pedal member when the rotary position indicator has reached a wide open throttle position.

9. An accelerator pedal assembly according to claim 8, wherein said bracket further comprises an integral shield extending from a base portion of said bracket proximate said wide open throttle stop such that foreign matter is prevented from being introduced between a portion of the follower which contacts the wide open throttle stop and the wide open throttle stop itself.

10. An accelerator pedal assembly according to claim 8, wherein said follower comprises a hub section mounted to the driveshaft and a depending lever section, with said hub section having an idle abutment for contacting said idle stop and an idle cam for directly contacting a plunger of an idle verification switch mounted to the bracket.

11. An accelerator pedal assembly according to claim 8, wherein said driveshaft, said follower, and said pedal member are biased into an idle position by said torsion springs.

12. An accelerator pedal assembly according to claim 8, wherein each of said torsion springs comprises a flat wound spring, with one of said springs being mounted on said driveshaft on either side of said follower.

\* \* \* \* \*